United States Patent
Ross et al.

(10) Patent No.: US 7,731,036 B2
(45) Date of Patent: Jun. 8, 2010

(54) REVERSIBLE VACUUM FILTER CARTRIDGE (75) Inventors: Arthur Ross, Stoney Creek (CA); George Feilders, Beaconsfield (CA)

(73) Assignee: SCP Science, Baie d'Urfe, Quebec (CA)

( * ) Notice: Subject to any disclaimer, the term of this patent is extended or adjusted under 35 U.S.C. 154(b) by 497 days.

(21) Appl. No.: 11/706,345

(22) Filed: Feb. 15, 2007

(65) Prior Publication Data
US 2008/0197067 A1 Aug. 21, 2008

(30) Foreign Application Priority Data
Jan. 18, 2007 (CA) .................... 2574322

(51) Int. Cl.
- B01D 27/08 (2006.01)
- B01D 35/02 (2006.01)
- B01D 29/085 (2006.01)
- B01D 29/00 (2006.01)

(52) U.S. Cl. .............. 210/459; 210/406; 210/416.1; 210/445; 210/446; 210/451; 210/455

(58) Field of Classification Search ............ None
See application file for complete search history.

(56) References Cited

U.S. PATENT DOCUMENTS

| | | | |
|---|---|---|---|
| 3,788,483 A * | 1/1974 | Conway | 210/416.1 |
| 5,873,967 A | 2/1999 | Clark et al. | |
| 2002/0164202 A1 * | 11/2002 | Bullivant | 403/296 |

* cited by examiner

Primary Examiner—Krishnan S Menon
Assistant Examiner—Benjamin Kurtz
(74) Attorney, Agent, or Firm—Ogilvy Renault LLP (57) ABSTRACT

A reversible vacuum filter cartridge for connection to a pair of tubes or other entities to filter a liquid medium placed in one of the tubes or other entities is described. The filter cartridge is comprised of a male coupling and a female coupling. The couplings are interconnected to one another by simply pushing a mating projection of the male coupling into a mating cavity of the female coupling. A connecting port is provided in the male and female coupling and has a conduit communicating with tube connecting ends of each of the couplings which communicate with an open end of a tube connected to each of the couplings. The connecting port is identical in each of the couplings and serves either as vacuum port or an air intake port. A filter disk is retained captive between perforated outer walls of each of the couplings when interconnected together in fluid-tight relationship.

16 Claims, 6 Drawing Sheets

REVERSIBLE VACUUM FILTER CARTRIDGE

TECHNICAL FIELD

The present invention relates to a reversible vacuum filter cartridge for connection to a pair of tubes or other entities whereby to filter a sample liquid medium placed in one tube or other entities into the other tube or other entities by inverting the tubes or other entities interconnected together by the filter cartridge and drawing a vacuum through a vacuum port.

BACKGROUND ART

The filter cartridge of the present invention is of the type as described in U.S. Pat. No. 5,873,967 wherein there is described a vacuum filter device adapted to connect to a pair of tubes with the upper one of the tubes containing a sample liquid medium to be filtered and the other tube or other entities receiving the filtrate passing through the filter. It is important with that filter device that the tube containing the sample liquid medium always be connected to a specific side of the filter as it will only operate in that position due to the construction of the filter cartridge. It is further pointed out that these filter cartridges are constructed for one-time use and after a liquid medium placed in a tube or other entities has been filtered the cartridge is discarded as the filter element cannot be replaced. The filter element is a porous membrane which is welded at its periphery to a plate prior to bonding the two holders of the cartridge together. The filter membrane is constructed from suitable polymeric materials such as mixed esters of cellulose, cellulose acetate, polycarbonate, polyvinylydene fluoride, polytetrafluoroethalene, nylon, polypropylene, polyethylene and other such polymeric substances. Because the filter membrane is welded it is not possible to re-use the entire cartridge after a single use as the porous membrane becomes saturated with trapped particles of the sample fluid medium that was filtered. It is also not possible to use a paper membrane with this filter cartridge.

Because of the welding of the filter membrane the assembly of the cartridge requires a further step in its construction and is therefore not simple in construction and assembly. The holders of the cartridge are also bonded in a back-to-back relationship by a welding technique such as ultrasonic welding to form an integral body. All of these steps in the assembly of the cartridge and associated welding equipment add to the cost of the cartridge which will eventually be discarded after a one-time use.

With these types of cartridges, a vacuum port is provided whereby a vacuum can be applied to the bottom tube whereby the sample liquid medium to be filtered in the upper tube is drawn through the filter. An air vent is provided in the cartridge to permit the ingress of air into the upper tube containing the sample liquid medium. As described in the referenced patent, injection molding methods generally provide the greatest dimensional control of shape with plastic parts. To apply conventional molding techniques for the fabrication of the cartridge would be desirable if one could mold a passageway into the wall of a cartridge to dimensions of 0.015 inches or less. However, because there is deformation caused by flashing when the molded parts are separated, this is not feasible. As described in that patent, this is because as the molten plastic enters the mould cavity the pin used to create the passageway would deflect leading to fatigue and breakage. Also, for the pin to seal off against the other wall of the cavity, the sealing end of the pin will be peened over in time leading to flashing. Flashing is an uncontrollable, undesirable migration of plastic, which in this example would lead to filling and dimensionally distorting the venting passageway. The fact that the venting passageway is dimensioned at 0.015 inches or less provides significant advantages in that the filtration device maintains its liquid-tight capabilities while air is admitted in the upper tube without employing an additional membrane covering the venting passageway to prevent solution from leaking out of the device during normal use. With the prior art this passageway is formed by a more expensive technique than would be the case with injection molding.

SUMMARY OF INVENTION

It is a feature of the present invention to provide a reversible vacuum filter cartridge which is connectible to a pair of tubes or other entities and wherein any one of the tubes or other entities may contain a sample liquid medium to be filtered and the filtrate transferred into the other tube or other entities whereby the filter cartridge is rendered fool-proof and easy to use.

Another feature of the present invention is to provide a reversible vacuum filter cartridge which is constructed of a male and female coupling which are both injection molded and which may easily be interconnected together in a fluid-tight sealing manner by simply pushing the male coupling part of the cartridge into the female coupling part.

Another feature of the present invention is to provide a reversible vacuum filter cartridge and wherein the filter element is not welded in the cartridge but which is retained captive between the male and female coupling elements when connected together and wherein the filter element may be constructed of polymeric material as well as paper.

Another feature of the present invention is to provide a reversible vacuum filter cartridge and wherein the male and female couplings are each provided with a connecting port having a conduit communicating with the tube connected thereto and wherein the connecting port in each of the couplings is identical to the other and can serve either as a vacuum port or an air intake port.

Another feature of the present invention is to provide a reversible vacuum filter cartridge and wherein the conduit of the connecting port communicating with the tubes is produced by injection molding and free of distortion or flashing.

Another feature of the present invention is to provide a reversible vacuum filter cartridge which substantially overcomes all of the above-mentioned disadvantages of the prior art.

According to the above features, from a broad aspect, the present invention provides a reversible vacuum filter cartridge for connection to a pair of tubes or other entities to filter a sample liquid medium placed in a tube or other entities of one of the pair of tubes or other entities and a filtrate collected in the other tube or other entities. The filter cartridge comprises a male coupling and a female coupling with each coupling having connecting means for securing to an open end of a respective one of the tubes or other entities. The male coupling has a mating projection dimensioned for close fit within a mating cavity of the female coupling. The mating projection has a perforated outer wall. The mating cavity also has a perforated bottom wall. Fluid-tight connecting means is provided about an outer coupling surface of the projection and an inner coupling surface of the mating cavity for securing the couplings together with the perforated outer wall juxtaposed to the perforated bottom wall. A connecting port is provided in each of the male and female couplings and has a communication conduit with the open end of the tubes. The connecting port is identical in each of the couplings and serves either as a vacuum port or an air intake port. A filter is retained captive between the perforated outer wall and the perforated bottom wall when the couplings are secured together by the fluid-tight connecting means.

BRIEF DESCRIPTION OF DRAWINGS

A preferred embodiment of the present invention will now be described with reference to the accompanying drawings in which.

DESCRIPTION OF PREFERRED EMBODIMENTS

Figure 10:
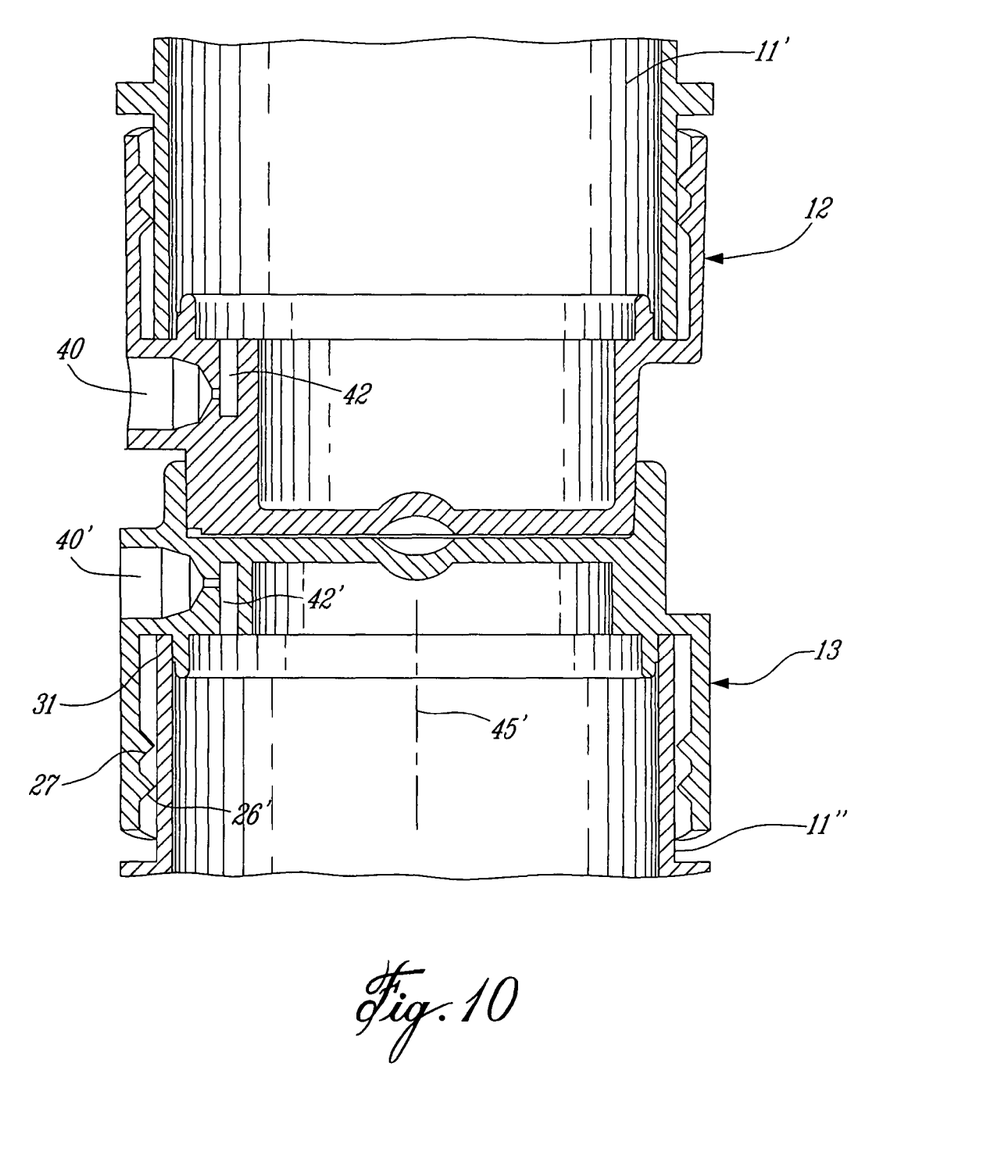
FIG. 10 is an enlarged view showing the filter cartridge in an assembled condition with a tube secured to each of the filter cartridge couplings.
Figure 11:
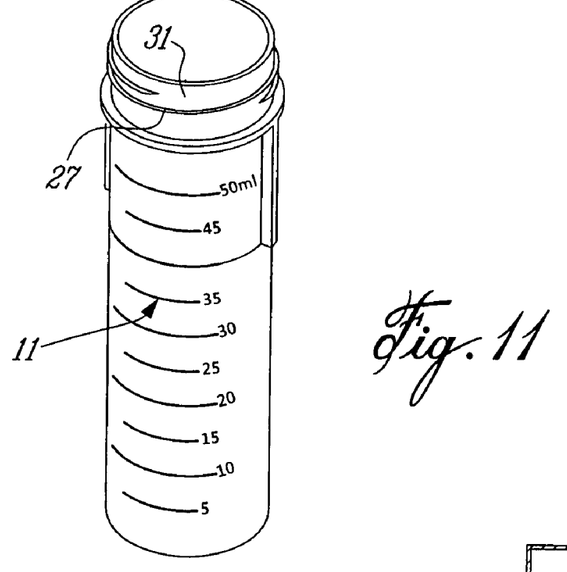
FIG. 11 is a perspective view showing the construction of a tube connectable to either one of the filter cartridge couplings.
Figure 12:
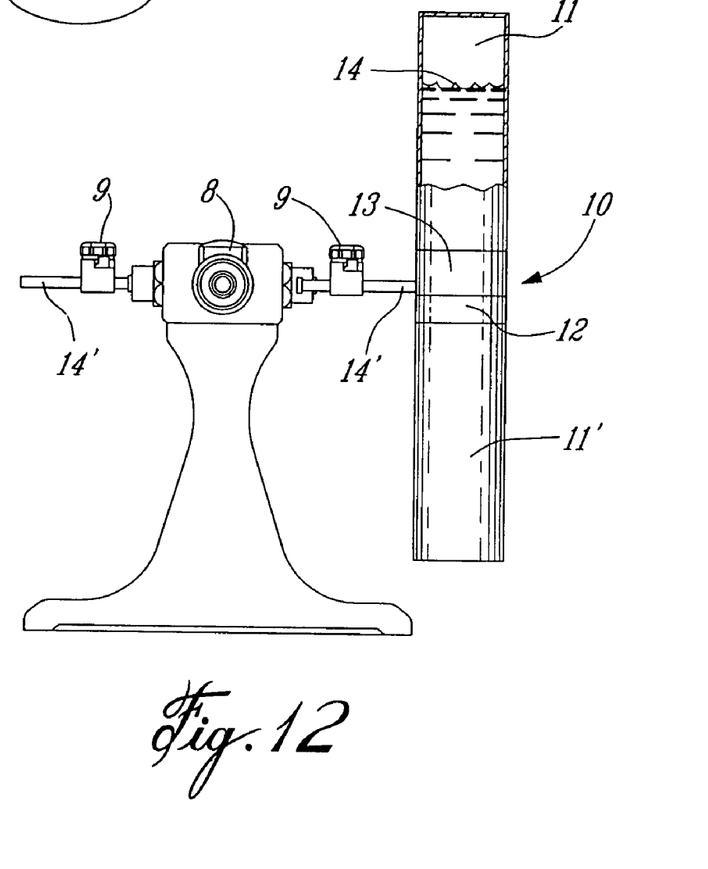
FIG. 12 is a schematic end view showing a cartridge to which a tube with a sample liquid medium is connected to, and the cartridge is secured to a vacuum port of a manifold bench rack whereby to draw the sample solution from the sample containing tube into the other tube connected to the cartridge and positioned under the sample containing tube, this being performed in an atmospheric pressure environment.

Referring now to the drawings and more particularly to FIGS. 10, 11 and 12, there is shown generally at 10 the reversible vacuum filter cartridge of the present invention for connection to a pair of tubes 11 as shown in FIG. 11. One tube 11' is herein shown as connected to a male coupling 12 and another tube 11" connected to a female coupling 13. The couplings 12 and 13 form the reversible vacuum filter cartridge of the present invention. A sample liquid medium to be filtered is placed in one of the tubes, either tube 11' or 11" and connected to any one of the couplings 12 and 13. An empty tube is connected to the other coupling. By inverting the assembly whereby the tube containing the sample medium is placed upward, as illustrated in FIG. 12, and subjecting the bottom one of the tube, herein tube 11" to a vacuum through the vacuum connection 14, the sample liquid medium is pulled through the filter cartridge and the filtrate is collected in the bottom tube 11". A vent hole admits ambient air into the upper tube, herein tube 11' not to create a vacuum therein. As shown in FIG. 12 the cartridge is connected to a manifold bench rack having a plurality of connectors 14 which are valve operated by valve 9 to connect to a vacuum source 8.

Figure 1:
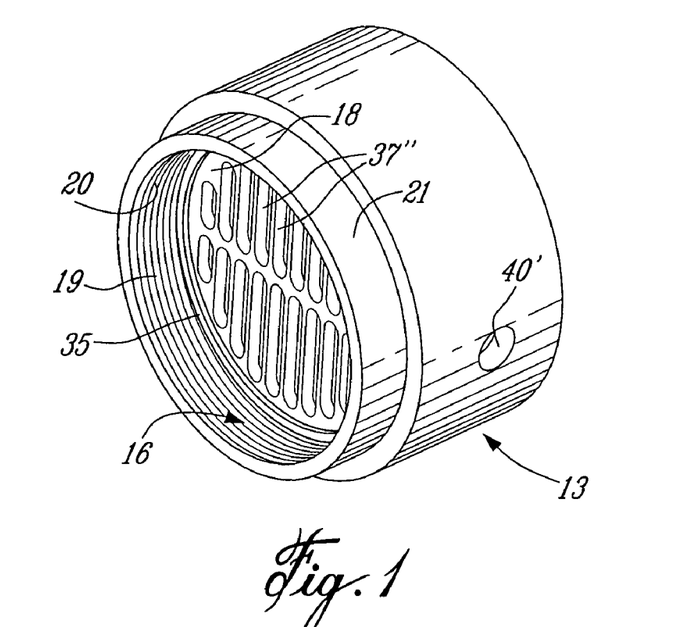
FIG. 1 is a perspective view of the female coupling forming the reversible vacuum filter cartridge of the present invention.
Figure 2:
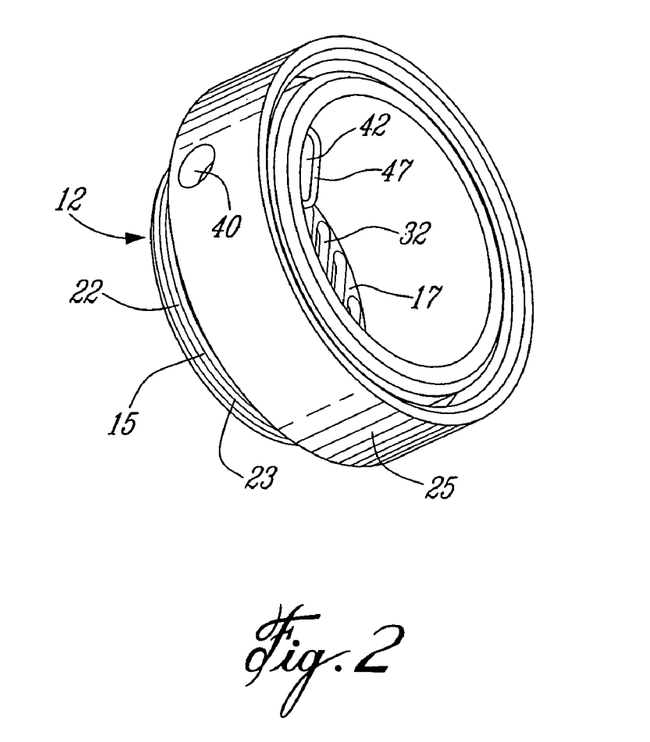
FIG. 2 is a perspective view of the male coupling from the mating cavity side thereof.
Figure 6A:
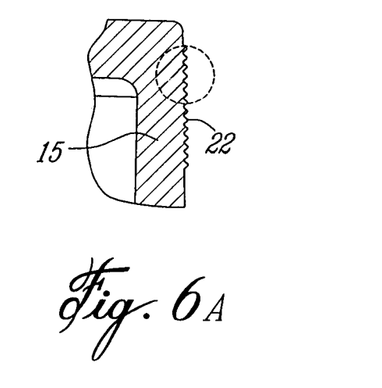
FIG. 6A is a fragmented, enlarged view of a corner of the mating projection of the male coupling showing the serrations formed therein.
Figure 6B:
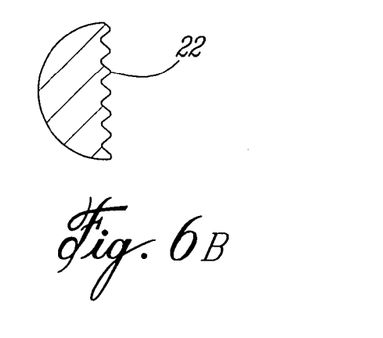
FIG. 6B is an enlarged view of the serrations.
Figure 7A:
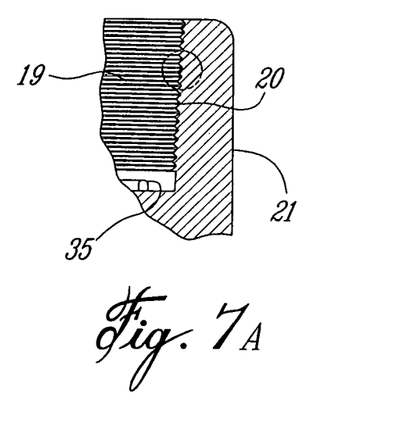
FIG. 7A is a fragmented view showing the serrations formed in the female coupling cavity.
Figure 7B:
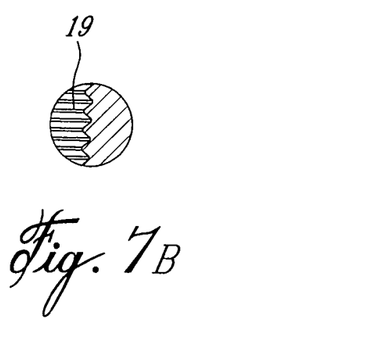
FIG. 7B is an enlarged view of the serrations.

A detailed description of the construction of the reversible vacuum cartridge of the present invention will now be described with reference to FIGS. 1 to 4. As shown in FIG. 2, the male coupling 12 is an injection molded part and is of cylindrical shape and provided with a mating projection 15 which is dimensioned for close fit within a mating cavity 16 provided in the female coupling 13 which is also injection molded. The male coupling 12 has a perforated flat outer wall 17 and the female cavity has a perforated flat bottom wall 18. The couplings are interconnected together by inserting the mating projection 15 of the male coupling into the female cavity 16 of the female coupling and in order to obtain a fluid-type seal therebetween there is provided a plurality of equidistantly and closely spaced circumferential serrations 19 on the inner surface 20 of the circumferential side wall 21 of the female coupling mating cavity and similar circumferential serrations 22 on the outer surface 23 of the mating projection 15 of the male coupling. FIGS. 6A and 6B illustrate the serrations 22 formed about the mating projection 15 while FIGS. 7A and 7B illustrate the serrations 19 formed within the inner surface 20 of the female coupling mating cavity. In order to obtain a fluid tight seal it is merely necessary to push the mating projection 15 within the female cavity 16 and a seal is established by the friction fit inter-engagement of the circumferential serrations of both couplings. Accordingly, there is no thermal welding, solvent bonding or thermal fusion in order to interconnect the two couplings together. It is also envisaged that this cartridge could be re-used if this is desirable by simply pulling the couplings apart and inserting a new filter disk, as will be described later, although this is not the intention with cartridges of this type which are usually for one-time use.

Figure 3:
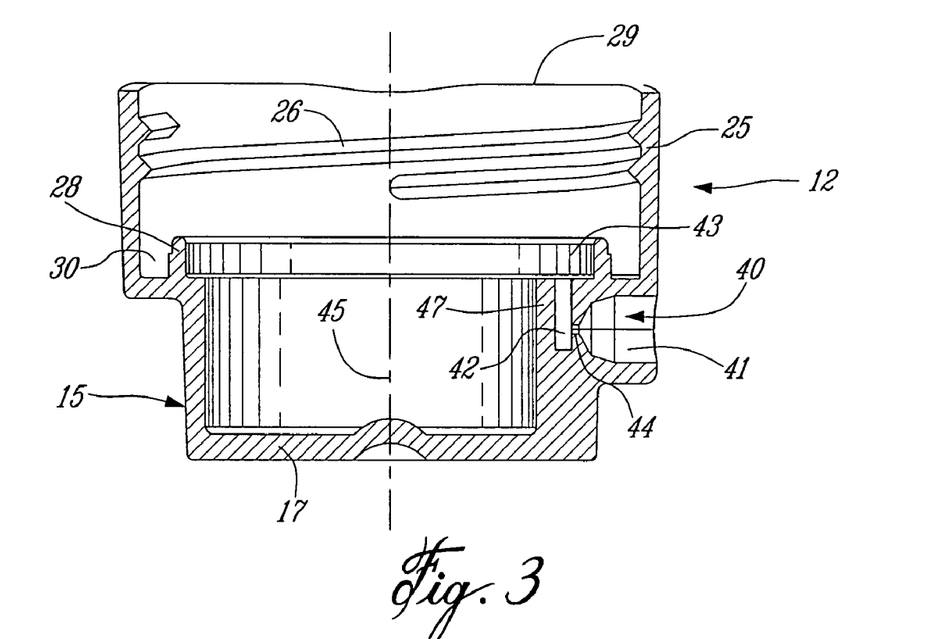
FIG. 3 is a section view through the male coupling.
Figure 4:
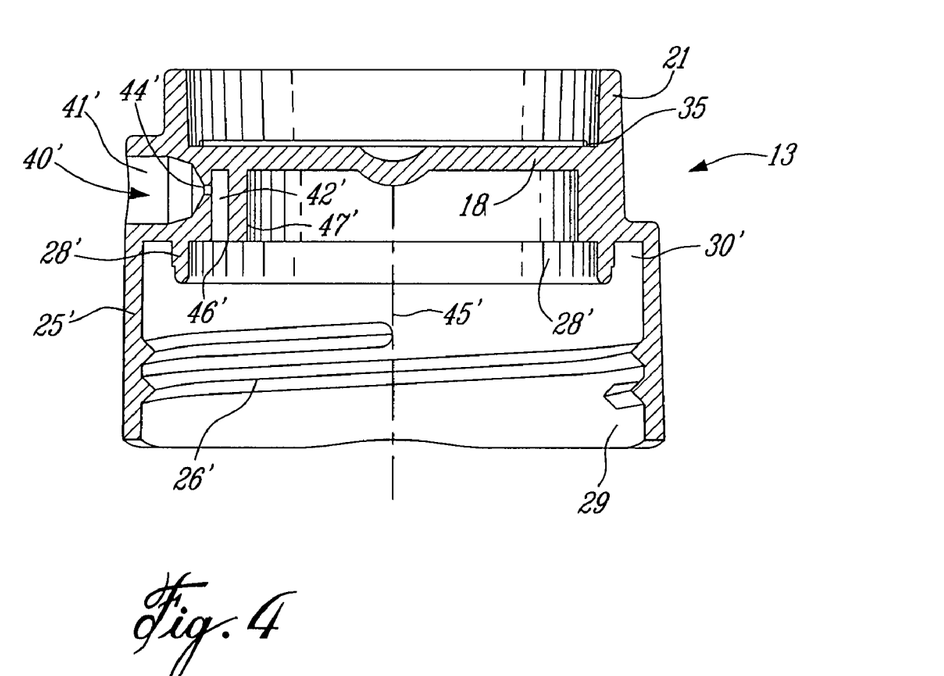
FIG. 4 is a section view through the female coupling.

Referring to FIGS. 3 and 4, it can be seen that each male and female couplings 12 and 13 are provided with a circular sleeve projection 25 and 25', respectively, having inner thread formations 26 and 26', respectively, for connection to the threaded formation 27 on these sample tubes 11, as shown in FIG. 11. Rims 28 and 28' project towards the open ends 29 and 29' of these sleeve projections whereby to provide a groove 30 thereabout for receiving an outer circumferential portion 31 (see FIG. 11) of a tube 11 in tight fit therein to prevent leakage.

Figure 8:
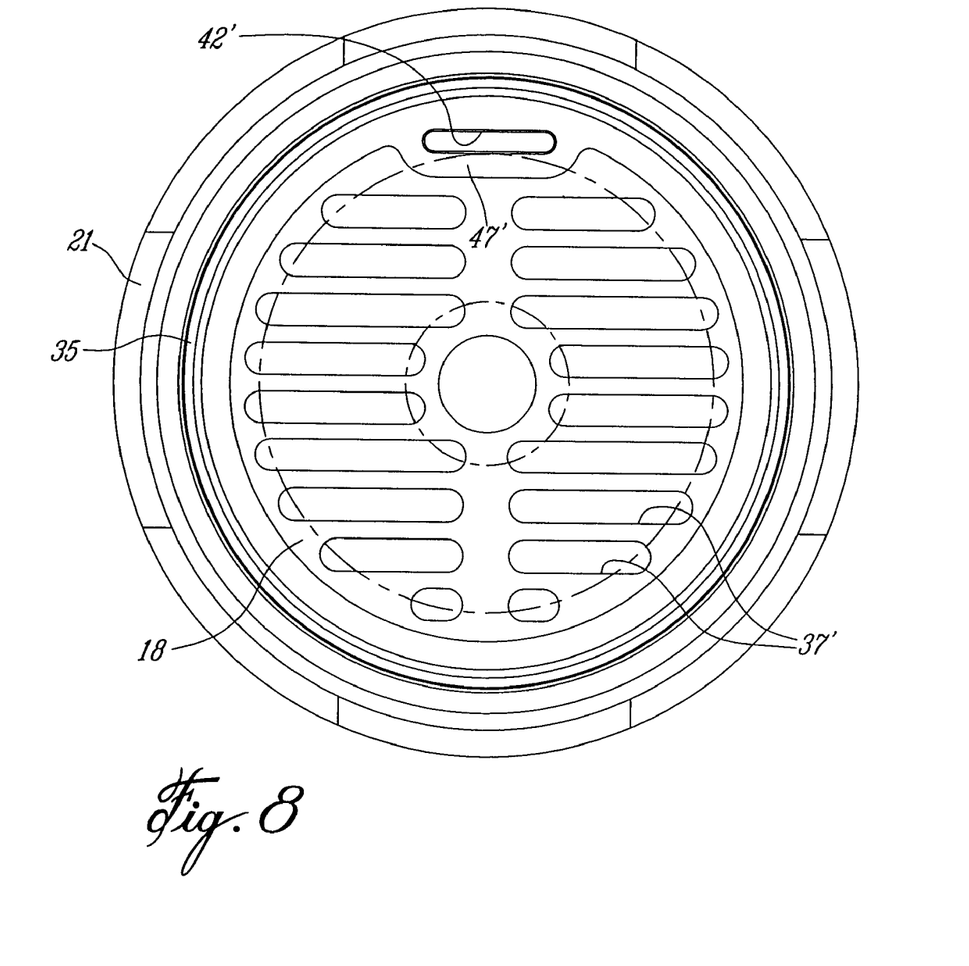
FIG. 8 is a plan view showing the construction of the perforated bottom wall of the female mating cavity illustrating the shape and size of the cavities.
Figure 9:
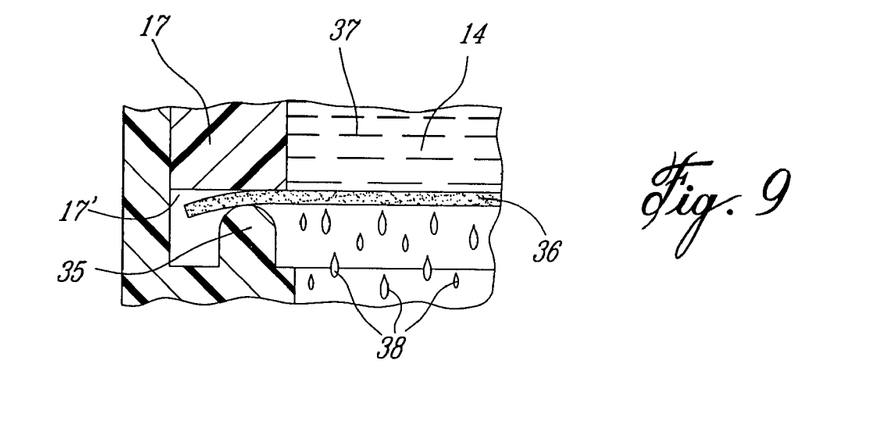
FIG. 9 is an enlarged fragmented section view showing a paper filter disk retained captive between the male coupling mating projection and the circumferential filter support ridge.

As shown in FIGS. 1, 4, 7A and 9, the female coupling 13 is provided with a circumferential ridge 35 molded in the perforated bottom wall 18 and extending into the mating cavity 16. This circumferential ridge 35, as more clearly shown in FIG. 9, is to support a filter disk such as the paper disk 36 shown in FIG. 9 thereover. The filter disk is herein a circular disk having a diameter greater than the circumferential ridge 35. When the mating projection 15 of the male coupling 12 is inserted within the female cavity 16, it pinches the filter disk over the ridge and retains it captive between the outer surface 17' of the perforated flat outer wall 17. The perforated flat outer wall 17 is provided with slotted throughbores 37 and similar slotted throughbores 37' (see FIG. 8) are provided in the perforated bottom wall 18 of the female coupling. The shapes of these are more clearly illustrated in FIG. 8. Accordingly, the sample liquid medium 14 is placed in direct contact with the filter disk 36 through the slotted throughbores whereby a filtrate 38 will be drawn through the disk and drawn into the filtrate receiving tube. In order to draw the sample liquid medium through the filter, a vacuum is applied in the area under the filter disk 36 and such will now be described.

As shown in FIGS. 1 to 4, 5A and 10, each of the couplings 12 and 13 are provided with connecting ports 40 and 40', respectively, and these ports are of identical construction. The connecting port 40 has a coupling cavity formation 41 which is dimensioned to receive the nipple end 14 of a suction connector, shown in FIG. 12, in close fit therein. This coupling cavity formation 41 communicates with a communication conduit 42 for the male coupling and 42' for the female coupling with the communication conduit 42 communicating with a space 43 intermediate the perforated outer wall 17 of the mating projection 15 and the tube connecting sleeve projections 25. A small throughbore passage 44 for the male coupling and 44' for the female coupling, interconnects the coupling cavity formation 41 with the communication conduit 42. This throughbore passage is 0.015 of an inch in diameter and formed in the injection molding process. The communication conduits 42 extend parallel to the longitudinal axes 45 and 45' of the couplings. The communication conduits 42 have openings 46 and 46', respectively, which are spaced from the perforated outer walls 17 and 18, respectively. This conduit 42 is slot-shaped, as illustrated in FIGS. 2 and 8, and a splash side wall 47 is formed adjacent to the space behind the perforated outer wall 17 and perforated bottom wall 18 to prevent the ingress of filtrate passing through the filter disk when a vacuum is applied to the conduit 42.

Figure 5A:
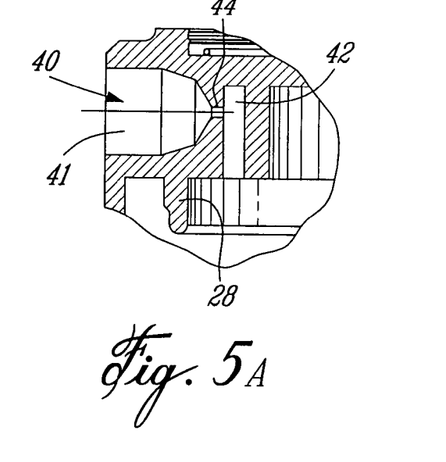
FIG. 5A is an enlarged view showing the construction of the connecting port and the communicating conduit.
Figure 5B:
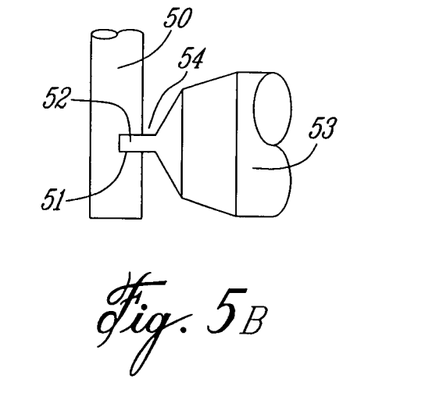
FIG. 5B is a simplified view showing the construction of the molding pins forming the connecting port and the communication conduit.

With reference now to FIGS. 5A and 5B, and as previously described, the couplings are entirely injection molded parts. The material for the couplings is 100% virgin polypropylene. The challenge in molding the connecting port 40 is to prevent flashing or distortion of the material when the pins are pulled out of the injected part cavities and this is particularly so for very small orifices such as the throughbore 44 which interconnects the coupling cavity formation 41 and the communication conduit 42. In order to be able to mold such small orifices the communication conduit pin 50 which projects within the mold is provided with a transverse pin cavity 51 in a side wall thereof to receive a free end of a transverse bore forming pin 52 projecting from the end of the coupling cavity profile part 53. The transverse bore forming pin 52 is retracted from the pin cavity 51 prior to the retraction of the conduit projecting pin 50. Accordingly, there is no flashing produced in the region 54 surrounding the pins 50, 51 and the part 53. With this pin arrangement the entire connecting port and its conduits are formed in a single injection mold.

As previously described, the purpose of the throughbore passage 44 being of such small size is to serve as an air vent which prevents leakage. With the present invention it also serves as a vacuum passage as both connecting ports can be used as either a vacuum port or as an air intake port depending on which of the couplings the tube with the sample liquid medium is connected to. Accordingly, the vacuum filter cartridge of the present invention is a reversible cartridge permitting the tube with the sample liquid medium and the empty tube to receive the filtrate being connected to either one of the male or female couplings.

Although the filter disk as illustrated in FIG. 9 is a paper disk, it is of course intended that the filter disk may be any type of synthetic filter disk or porous membrane depending on the filtration application. For example, the application could be a sterile filtration of tissue culture media wherein the filter may be a microporous membrane suitable for this use.

Summarizing the reversible vacuum filter cartridge of the present invention is constructed of interconnecting male and female couplings which are easy to assemble and which does not use any welding in its construction and wherein a filter disk is easily connected to the couplings. Accordingly, the filter disk can be of any type depending on the intended use of the cartridge. The filter cartridge is therefore universal in application by requiring only that the proper filter disk be used for a selected application or desired application. The assembly of the couplings is simple, requiring the user to merely insert a filter disk and push one coupling within the other coupling. The connecting ports are identical in each of the couplings and can be used either as a vacuum port or an air intake port and the tube containing the sample solution can be connected to any one of the couplings without fear of the sample solution leaking.

It is pointed out that the reversible vacuum filter cartridge may be connected to other entities such as a conduit, or other type containers, having connectors for engagement with the connectors of the male and female couplings.

We claim:

1. A reversible vacuum filter cartridge for connection to a pair of tubes or other entities to filter a sample liquid medium placed in a tube or other entities of any one of said pair of tubes or other entities and a filtrate collected in the other tube or other entities, said filter cartridge comprising an injection molded male and female coupling, each said couplings having identical integrally formed connecting means for securing to an open end of a respective one of said tubes or other entities thereto, said male coupling having a mating projection dimensioned for close fit within a mating cavity of said female coupling, said mating projection having an integrally formed perforated outer wall, said mating cavity having an integrally formed perforated bottom wall, fluid-tight connecting means about an outer coupling surface of said projection and an inner coupling surface of said mating cavity for securing said couplings together with said perforated outer wall juxtaposed to said perforated bottom wall, an identically formed connecting port in each said male and female couplings having a communication conduit with an open end facing rearwardly of said perforated outer wall of said male coupling and perforated bottom wall of said female coupling for communication with said open end of said tubes, said connecting ports serving either as a vacuum port or an air intake port, a filter retained captive between said perforated outer wall and said perforated bottom wall when said couplings are secured together by said fluid-tight connecting means.

2. A reversible vacuum filter cartridge as claimed in claim 1 wherein said fluid-tight connecting means are constituted by a plurality of equidistantly closely spaced circumferential serrations in said outer coupling surface and said inner coupling surface.

3. A reversible vacuum filter cartridge as claimed in claim 2 wherein said mating projection and said mating cavity are of circular shape, said circumferential serrations in said outer coupling surface inter-engaging in friction fit with said circumferential serrations of said inner coupling surface by pushing said mating projection into said mating cavity.

4. A reversible vacuum filter cartridge as claimed in claim 1 wherein said conduit of said connecting port of said female connector communicates with a space intermediate said perforated bottom wall of said mating cavity and said tube connecting means, said conduit having a throughbore passage with said connecting port.

5. A reversible vacuum filter cartridge as claimed in claim 4 wherein said conduit extends parallel to a longitudinal axis of said couplings when said couplings are connected together, said conduit having an opening spaced from said perforated bottom wall.

6. A reversible vacuum filter cartridge as claimed in claim 5 wherein said conduit is a slot-shaped conduit defining a splash side wall in said space to prevent ingress of filtrate when a vacuum is applied to said conduit.

7. A reversible vacuum filter cartridge as claimed in claim 1 wherein said conduit of said connecting port of said male connector communicates with a space intermediate said perforated outer wall of said mating projection and said tube connecting means, said conduit having a throughbore passage with said connecting port.

8. A reversible vacuum filter cartridge as claimed in claim 7 wherein said conduit extends parallel to a longitudinal axis of said couplings when said couplings are connected together, said conduit having an opening spaced from said perforated outer wall.

9. A reversible vacuum filter cartridge as claimed in claim 8 wherein said conduit is a slot-shaped conduit defining a splash side wall in said space to prevent ingress of filtrate when a vacuum is applied to said conduit.

10. A reversible vacuum filter cartridge as claimed in claim 3 wherein said connecting means of each said couplings for securing to an open end of a respective one of said tubes or other entities are constituted by a circular sleeve projection projecting rearwardly of each mating projection and said mating cavity, said sleeves having thread formations in an inner surface thereof for engagement with a thread formation about said open end of said tube.

11. A reversible vacuum filter cartridge as claimed in claim 1 wherein said filter is a filter disk freely supported over a circumferential ridge formed in said perforated bottom wall and extending into said mating cavity, said filter disk being retained captive between said circumferential ridge and said perforated outer wall of said mating projection.

12. A reversible vacuum filter cartridge as claimed in claim 11 wherein said filter support circumferential ridge is a circular ridge having a diameter greater than the diameter of said mating projection.

13. A reversible vacuum filter cartridge as claimed in claim 11 wherein said filter disk is one of a paper filter or synthetic material filter disk.

14. A reversible vacuum filter cartridge as claimed in claim 1 wherein said injection molded male and female couplings are polypropylene couplings.

15. A reversible vacuum filter cartridge as claimed in claim 14 wherein said conduit has a transverse throughbore passage communicating with said connecting port and formed in an injection molding mould by a conduit projection pin shaped as said conduit, said projection pin having a pin cavity in a side wall thereof to receive a free end of a transverse bore forming pin projecting from a connector profiled mould projection, said transverse bore forming pin being retracted from said pin cavity prior to the retraction of said conduit projection pin.

16. A reversible vacuum filer cartridge as claimed in claim 1 wherein said perforated outer wall and bottom wall are flat walls.

* * * * *